Dec. 15, 1936. W. C. CARD, JR 2,064,291
TRIMMING MACHINE
Filed July 15, 1932 3 Sheets-Sheet 1
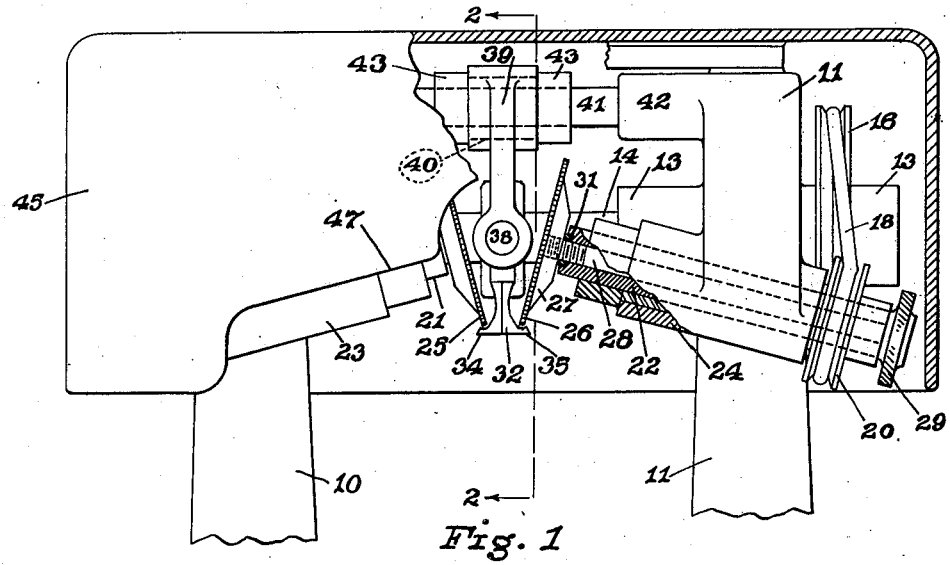
Fig. 1
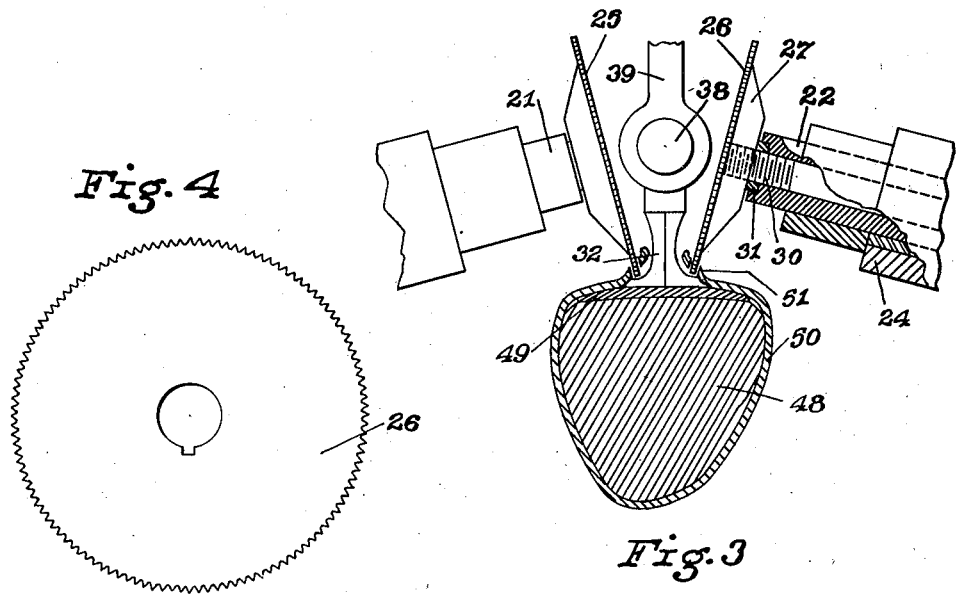
Fig. 4
Fig. 3
William C. Card, Jr.
INVENTOR
BY
Watson, Bristol, Johnson & Leavenworth
ATTORNEYS

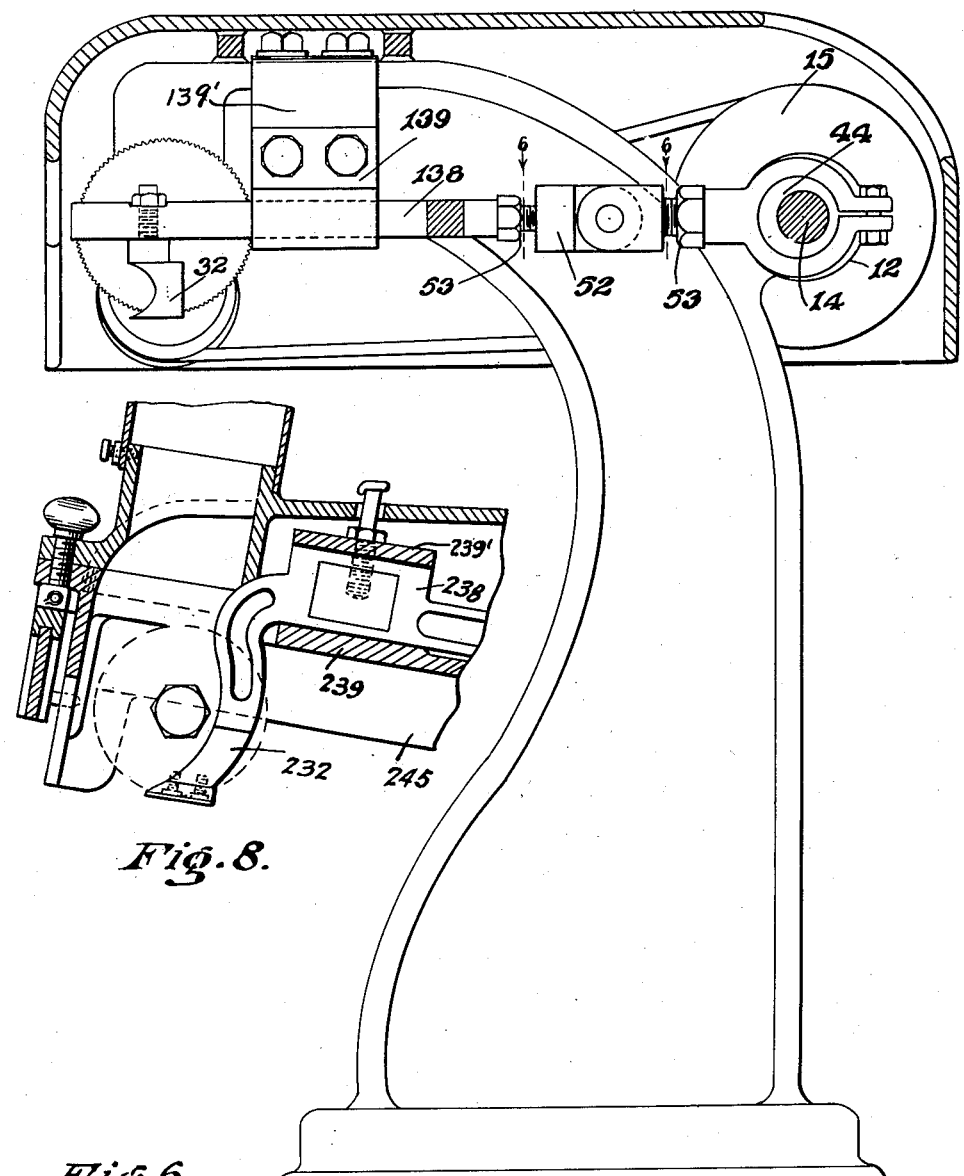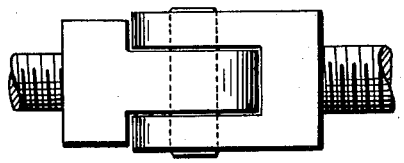

Patented Dec. 15, 1936

2,064,291

UNITED STATES PATENT OFFICE 2,064,291

TRIMMING MACHINE

William Carpenter Card, Jr., Winthrop, Mass., assignor to Compo Shoe Machinery Corporation, New York, N. Y., a corporation of Delaware Application July 15, 1932, Serial No. 622,587

21 Claims. (Cl. 12—83.5)

This invention relates to the manufacture of shoes, and more particularly to the trimming of the lasting allowance at the shank. The invention is useful for trimming any type of shoe which is so lasted that there is an excess lasting allowance at the shank portion thereof, but is especially advantageous when used in connection with cemented shoes.

It is an object of the invention to provide an apparatus which is adapted automatically to trim the excess lasting allowance at the shank of a shoe, thus obviating any hand operation at this stage of manufacture.

A further object of the invention is the provision of a trimming machine which is adapted to trim the lasting allowance from both sides of the shank of a shoe in a single cutting operation, and which is adapted to be used with any shoe regardless of variations in size, or in the natures of the upper materials employed.

Another object of the invention is to provide a saw for successfully cutting the lasting allowance of a shoe, when the upper is made either of leather or fabric.

Yet another object of the invention is to provide a method of trimming excess lasting allowance, whereby rapidity of operation and economical maintenance of the cutting tools are secured.

A still further object of the invention is to provide a novel method of entirely trimming the lasting allowance at the shank portion of a shoe in a single operation, with consequent material saving of time and labor.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a front elevation of a trimmer constructed in accordance with the present invention, certain parts thereof being taken away more clearly to illustrate the details of construction;

Fig. 3 is an enlarged fragmentary view showing certain of the parts illustrated in Fig. 1 in operation upon a lasted upper, the latter being shown in transverse section through the shank portion thereof;

Fig. 4 illustrates one form of cutting tool employed in the present trimmer;

Fig. 5 illustrates another form of trimmer similar to that shown in Fig. 2;

Fig. 6 shows a detail plan view of the knuckle member taken along the line 6—6 in Fig. 5;

Fig. 8 is a fragmentary vertical sectional view taken approximately along the longitudinal center of the device shown in Fig. 7.

In the manufacture of most types of shoes, an insole is positioned on the bottom of a last, and an upper is placed about such last, with its lasting allowance pulled over into overlapping relation with the inner sole, to which it is affixed by some suitable means such as stitching, stapling, tacks, adhesive or the like. Before the outer sole is ultimately applied to such lasted upper, the excess lasting allowance at the shank from ballpoint to heel portions thereof must be trimmed away in order to position the shank piece and allow the sole to seat properly. In the case of cemented shoes this has heretofore usually been a manual or semi-manual operation in view of the extreme difficulty encountered in separating the lasting allowance materially from the inner sole when the former becomes stuck by cement.

The trimmer contemplated in the present invention, one suitable embodiment of which is about to be described, is capable of rapidly shank trimming lasted uppers, with a minimum of skill and effort on the part of the operator even when the excess lasting allowance adheres to the inner sole, and this without scoring or otherwise damaging the latter.

Figure 2:
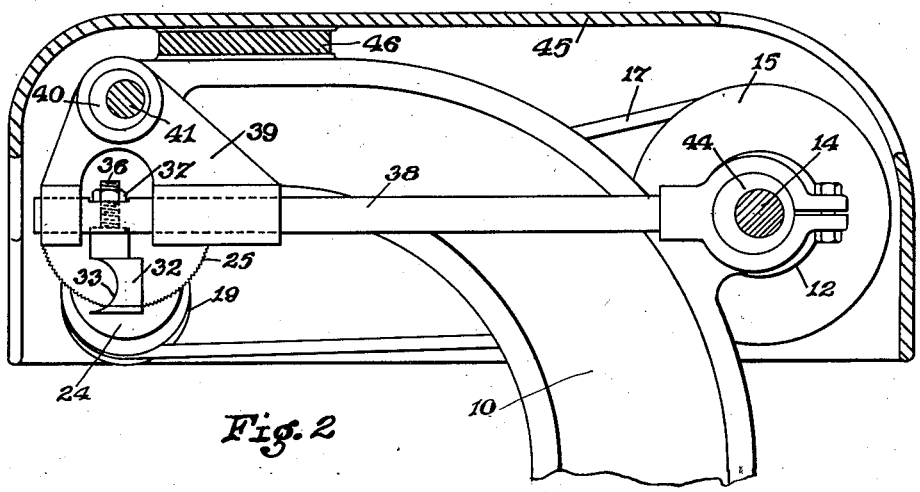
Fig. 2 is a sectional view substantially corresponding to line 2—2 of Fig. 1.

Referring more particularly to the drawings, and especially to Figs. 1 and 2 thereof, there is shown a trimming apparatus mounted upon a pair of standards 10 and 11, which, respectively, are provided near their rearward upper portions with journals 12 and 13, in which is rotatably mounted a main shaft 14, which is adapted to be driven by any suitable means such as an electric motor (not shown). A pair of driving pulleys 15 and 16 are keyed to shaft 14 near the outer ends thereof, and by means of belts 17 and 18, are adapted to effect rotation of a pair of driven pulleys 19 and 20. Such driven pulleys, respectively, are keyed to spindles 21 and 22, which are freely rotatable in a pair of tilted journals 23 and 24, which preferably are formed integrally with and suspended from the forward ends of standards 10 and 11. A pair of cutting tools 25 and 26 are replaceably mounted, respectively, to rotate with each of spindles 21 and 22. This mounting is identical for each cutting tool, and as illustrated in Figs. 1 and 3, comprises a disc flange 27, against which the cutting tool is rigidly seated, and which is bolted to spindle 22 by means of a bolt 28 which extends interiorly therethrough, and which is provided at its outer end with a knurled head 29. The other end of bolt 28 is threaded as at 30 and is adapted to be screwed into flange 27. A shim 31, in the form of a ring shaped washer, is disposed between flange 27 and spindle 28. By unscrewing bolt 28 and inserting differently sized shims at 31, the distance between the two cutting tools can be varied to effect shank trims of different widths, as will more clearly appear hereinafter. As shown, the cutting tools preferably are mutually tilted with their lowermost portions in closest proximity. The cutting operation is effected at these lowermost juxtaposed portions.

Disposed between cutting tools 25 and 26 is a plow member 32 which is adapted to loosen the lasting allowance from the innersole, and guide the same into the path of the cutting tools. This plow member preferably has a tapered forward edge 33 and widens at its bottom to form two integral wings 34 and 35, which extend beneath the cutting edges of tools 25 and 26 and act to lift the edges of the lasting allowance toward the cutting tools 25 and 26. The upper surfaces of wings 34 and 35 may be provided with grooves into which the cutting tools fit rather snugly. The plow is also preferably detachably mounted on the machine so that plows of different widths may be utilized. The plow 32 is preferably mounted for independent movement and, in the case of cemented shoes, acts as a positive routing tool. Such mounting as shown comprises a bolt 36 and a nut 37, by means of which it is rigidly fastened to a pitman 38, which is slidably mounted in a suspended hanger 39. Hanger 39 is pivotally mounted on an eccentric 40 which is rotatable with shaft 41 mounted in a pair of journal bosses such as 42, which are provided at the upper forward portions of each of standards 10 and 11. Eccentric 40 is adapted to be fixed in any of the number of desired positions, in order to effect vertical adjustment of plow 32. The lateral position of eccentric 40 and hanger 39 carried thereby, can be determined by means of collars 42 and 43, which are adapted to be affixed to shaft 41 by any suitable means, such as set screws (not shown). Pitman 38, at its rearward end is carried by an eccentric 44 which is mounted on and rotatable with shaft 14. This arrangement causes rotation of shaft 14 to impart vertical and horizontal movement to plow 32, which by virtue of its sliding suspension from shaft 41 describes an approximately elliptical path as eccentric 44 rotates. When wings 34 and 35 are inserted between the lasting allowance and the inner sole, this movement of the plow is efficacious in separating these parts, which may have become stuck, and also acts to lift the lasting allowance into the path of the cutting tools. When the shoe being trimmed has been cement lasted, it frequently occurs that the excess lasting allowance of the upper becomes firmly united to the inner sole, thus increasing the difficulty of the trimming operation at the shank. The plow used in the present trimmer is adapted to vigorously rout or gouge such cemented lasting allowance so as to free the latter from the inner sole at the same time the cutters sever it from the remaining upper stock.

In the embodiment shown in Figs. 5 and 6, the mechanism is similar to that shown in Fig. 2, except that the pitman 138 is slidably mounted in a fixed hanger 139 and is provided with a knuckle member 52 having adjusting nuts 53 at the ends thereof. Here the hanger 139 is rigidly fastened in a position spanning the arms 10 and 11 and carries a substantially medially located slidable mounting for pitman 138 which mounting snugly fits around the latter. This mounting may be supported from the standards 10 and 11 in any convenient manner, as for example by means of a pair of opposed curved straps, such as that illustrated at 139', which may have one end screwed to the top of its respective standard 10 or 11, and have its other end curved or bent downwardly into proper supporting relationship for screw connection with the mounting 139. Preferably this slidable mounting and the pitman have corresponding polygonal cross sections to insure against undesired axial rotation of the pitman. As the pitman 138 here comprises a reciprocatory rod and a rearwardly disposed pivotally attached crank portion or element, the construction imparts pure straight-line reciprocatory movement to the plow or routing tool 32. The latter, by virtue of the upwardly and rearwardly sloping guide surfaces on its wings 34 and 35, acts to lift and guide the excess lasting allowance up to the cutting tools, despite absence of the vertical component of plow movement present in the previously described form of the invention. Accordingly, it will be seen that both described constructions are capable of lifting and guiding such portions upwardly into the path of the cutting tools and routing inadvertently cemented excess lasting allowance portions from the inner sole. As will more clearly appear hereinafter, the preferred form of cutting tool used in the trimmer is adapted to effect a sawing cut, as contrasted with a shearing cut. Since the plow is not required to cooperate with the cutting devices to effect a shearing action on the cut material, but, on the other hand, is spaced therefrom and operates independently thereof in the sense that it is not necessary for it to be kept adjusted in shearing contact therewith, it is capable of performing the rough and vigorous routing action involved in separating materials without fear of maladjustment of the cutting devices. Also, the screw adjustment introduced at 53 in the form shown in Fig. 6, allows ready and precise adjustment of the movement and location of the routing tool 32.

Figure 7:
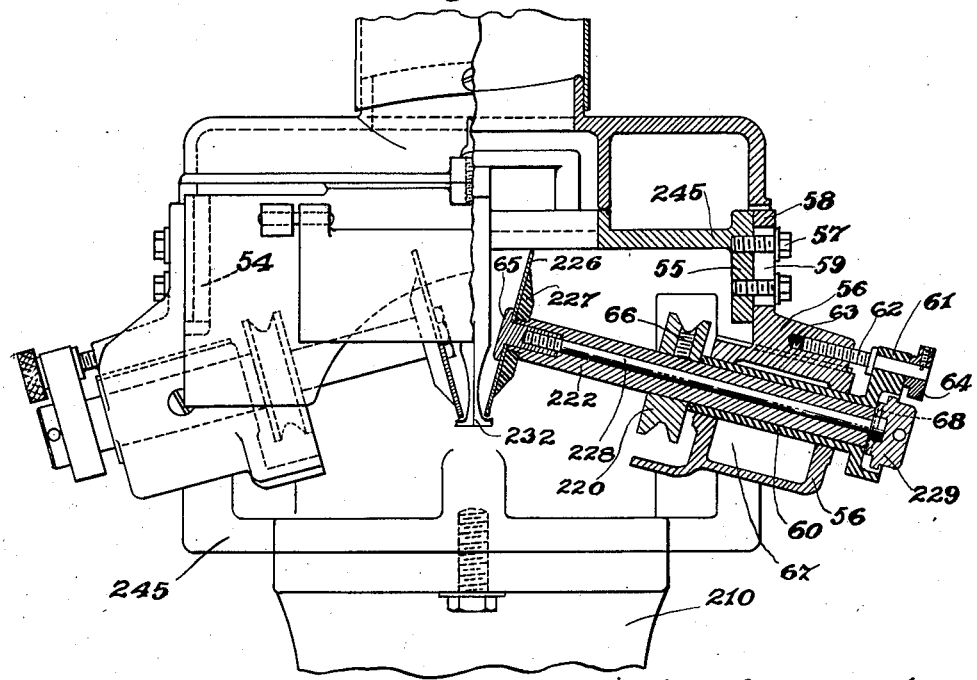
Fig. 7 is a fragmentary front elevation, shown partially in section, illustrating another embodiment of the invention.

In Figs. 7 and 8, there is shown a different, and in fact a preferred, arrangement for mounting the cutting tools. This arrangement comprises a supporting standard 210 upon which rests a combined support and housing casting 245. This housing has within it or associated with it suitable driving tools and has a pitman and plow structure arranged therein which may optionally follow the constructions set forth either in Fig. 1 or Fig. 5. As illustrated in Fig. 8, there may be provided a pitman 238 which is adapted to be reciprocated in a straight line, by suitable eccentric and crank means such as that illustrated in Fig. 5. To this end, the pitman 238 is mounted for reciprocatory sliding movement between a mounting web 239 which may be cast integrally with housing 245, and a cooperating mounting strap 239' which may be fastened in confining relation above an enlarged portion of pitman 238, in any convenient manner. The plow or routing tool is indicated at 232. Casting 245 has laterally disposed supporting ears 54 and 55 upon which respectively are mounted the rotary cutting tools and their immediately associated equipment. This equipment preferably is identical for both tools and will be described in connection with one of the cutting tools 226. A journal bearing casting 56 is screwed to ear 55 by means of screws 57. These screws pass through an upwardly extending attaching lug 58, integral with journal bearing 56 and slotted as at 59 to permit vertical adjustment of the latter. A sleeve or bushing element 60 is fitted within the journal opening of bearing 56 and is provided at one end with an enlarged head 61. An adjusting screw 62 is freely rotatable within this head 61 and has its threaded portion operable within a threaded hole 63 in journal casting 56. Screw 62 is clamped against relative axial movement with respect to head 61, as, for example, by means of a thumb-screw head 64 which is adapted to be fastened in place thereover by means of a set screw. By virtue of this arrangement rotation of adjusting screw 62 causes bushing 60 to move in the direction of its own axis with respect to journal bearing 56. The cutting tool spindle 222 is fitted for free rotation within bushing 60 and has passing centrally therethrough a bolt 228 which is adapted to be screwed into an internally threaded clamping head 65 so as to clamp the disk cutter 226 and its supporting flange 227 firmly to the spindle. The head of bolt 228 has an enlarged head 229 fastened thereto by means of a pin 68. Head 229 is sufficiently extensive to bear against bushing 60 so as to limit movement of spindle 222 in one direction with respect to such bushing. A driven pulley 220 is adapted to be adjustably located along spindle 22 by means of a set screw 66. This pulley is disposed in abutting relation with the inner end of bushing 60 and cooperates with head 229 to prevent relative movement in an axial direction between spindle 222 and its bushing 60. The journal bearing 56 preferably is provided with an oil chamber 67 which may be packed with oil soaked waste or the like which may communicate with the rotating surface of spindle 222 through suitable oil perforations or grooves (not shown) in bushing 60.

With the arrangement shown in Fig. 7, the cutting tools may be vertically adjusted with respect to the routing tool 232 by means of the slot and screw construction at 57 and 59. Horizontal adjustment to vary the distance between the cutting edges of the cutting tools is effected by rotation of adjusting screws such as 62, which causes bushing 60 to move in the direction of its own axis with respect to journal 56. Bushing 60 in turn carries spindle 228 with it, thus effecting adjustment of the position of cutting tool 226.

In certain aspects, the present invention contemplates the use of any cutting tool which is adapted suitably to cooperate with the other component parts of the machine as described and claimed. In order efficiently to trim the shank portions of lasted uppers with the herein described type of machine it is eminently desirable that a rotary cutting tool which is capable of cleanly trimming either leather or fabric upper materials be furnished. Such a tool has been developed in accordance with the present invention, and comprises a saw having the proper characteristics as to its speed, diameter, thickness, number and shape of teeth.

A preferred form of saw for this purpose is illustrated in Fig. 4. Such saw is 2.75 inches in diameter, has a thickness of .016 inch and carries 120 teeth, which, as shown, are preferably symmetrical with respect to a radius therethrough, and form an angle of about 60°, more or less, at their apices. This saw is mounted on flange 27, and is rotated at a speed of about 6500 R. P. M. When operated at this speed, approximately 13,000 teeth per second are carried past a given point at the saw periphery. In order to secure good shank trimming results, this speed in teeth per second should be adhered to within reasonable limits, say 11,500 to 15,000 teeth per second. One very satisfactory design for obtaining this range includes saws carrying from 115 to 125 teeth, and operating at from 100 to 120 revolutions per second. The diameter, speed and number of teeth may be varied, but the relation between these factors should be such as to maintain the tooth-per-second rate substantially within the herein prescribed limits. Thus a saw bearing twice as many teeth and operated at half the speed is capable of giving satisfactory results. In the preferred illustrated example, the saw periphery is provided with approximately 14 teeth per inch, and has a thickness of .016 inch, as stated. In general, the thicknesses of the saw should be from one-quarter to one-half of the distance between two successive teeth. In the illustrated machine, any desired speed of rotation of the cutting saws may be obtained by providing pulleys 15 and 19 of proper size. These pulleys are detachable and may either or both be exchanged for different pulleys of varied size, in order to secure a proper operating speed.

A hood 45 covers most of the working parts of the machine, and rests upon a spanner 46, which extends between and is seated upon the upper surfaces of standards 10 and 11. The forward wall of hood 45 is cut away as at 47, to provide access to the operating portions of the cutting tools.

In operation of the device as described main shaft 14 is rotated at about 2600 R. P. M., causing plow 32 rapidly to move in its prescribed path, and effecting rotation of the cutting tools at the aforementioned speed of approximately 6500 R. P. M. through the agency of pulleys 15, 19, 16 and 20. With the trimmer running in this manner, a lasted upper such as 48 (Fig. 3) comprising an inner sole 49 and an upper 50, which may be cemented thereto, is brought into proximity with the lower edges of cutting tools 25 and 26. A cut preferably is begun at the heel of the shoe and continued forwardly along the shank portion to the forepart, by moving the shoe in a straight line past the cutting tools. This trimming cut may be made in the reverse direction, if desired. At the beginning of the operation, the inner sole is placed against plow 32, and wings 34 and 35 are inserted under the opposed converging edges of the shank lasting allowance as the shoe is moved. These wings on the rapidly moving plow work under the excess lasting allowance illustrated at 51, and lift the same away from the inner sole toward the cutting edges of the tools. Since wings 34 and 35 extend beneath the cutting edges of the rotating tools, they act in the capacity of guard members and prevent undesired scoring of the inner sole.

It will be seen that means have been provided whereby both sides of the upper of a shoe can be rapidly and efficiently trimmed in a single cutting operation, without any danger of damaging the inner sole. The trim can be made of any desired width, by using suitable spacing shims at 31, and selecting a plow 32 of proper width to cooperate with the spaced cutting tools. Such width usually corresponds to or approximates the width of the metal shank piece which customarily is inserted in this part of the finished shoe.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A trimmer for removing excess lasting allowance from a lasted upper, comprising a rotary disk cutter mounted to cut through such lasting allowance in a plane intersecting that of the bottom of the upper, and an opposed guard member insertable between the lasting allowance and inner sole of such upper and interposed between the cutting edge of said cutter and the inner sole during operation.

2. A trimmer for removing excess lasting allowance from a lasted upper, comprising, in combination, a rotary cutting saw individually capable of saw-cutting upper materials, and a plow spaced in non-shearing relation from said saw in position for guiding a lasting allowance of an upper toward the cutting edge of such saw.

3. A trimmer for removing excess lasting allowance from a lasted upper having such allowance lasted in substantially flat overlying relation against the insole, comprising a rotary disk cutter mounted to cut through such lasting allowance in a plane intersecting that of the insole, and a combined plow and guard member insertable between the lasting allowance of an upper and an inner sole to guide the lasting allowance to the cutting edge of said tool, said guard being interposed between the cutting edge of said tool and the inner sole during operation to protect the inner sole from said tool.

4. A trimmer, comprising, in combination a pair of cutting tools adapted respectively simultaneously to trim surplus lasting allowance from opposite sides of a shoe, and guard means interposed between the cutting edges of said tools and the inner sole of such shoe during operation.

5. A trimmer, comprising, in combination, a pair of rotary saws adapted respectively to trim surplus lasting allowance from opposite sides of the shank of a shoe, and means for guiding said lasting allowances toward the cutting edges of said saws.

6. A trimmer, comprising, in combination, a pair of cutting tools adapted respectively to trim surplus lasting allowance from opposite sides of the shank of a shoe, guide means for guiding said lasting allowance toward the cutting edges of said tools, and guard members on said guide means interposed between the cutting edges of said tools and the inner sole of such shoe during operation.

7. A trimmer, comprising, in combination, a pair of tilted, spaced, rotary cutting saws, having their proximate edges spaced apart a distance equal to that desired between the edges of the lasting allowance at the shank of a shoe upper and each respectively adapted to trim one side of the lasting allowance of a lasted upper in a plane intersecting the inner sole of such upper.

8. A trimmer, comprising, in combination, a pair of tilted, spaced, rotary cutting saws, having their proximate edges spaced apart a distance equal to that desired between the edges of the lasting allowance at the shank of a shoe upper, and means for adjusting said saws to vary said distance, each of said saws being respectively adapted to trim one side of the lasting allowance of a lasted upper in a plane intersecting the inner sole of such upper.

9. A trimmer, comprising, in combination, a pair of cutting saws each adapted individually to saw-cut surplus lasting allowance from opposite sides of a shoe, a plow spaced from said saws for loosening and guiding said lasting allowances to the cutting edges thereof, and means for imparting independent movement to said plow.

10. A trimmer, comprising, in combination, a pair of cutting saws each adapted individually to saw-cut surplus lasting allowance from opposite sides of a shoe, a plow spaced from said saws for loosening and guiding said lasting allowances to the cutting edges thereof, and means for imparting reciprocatory movement to said plow.

11. A trimmer, comprising, in combination, a pair of cutting saws adapted respectively to trim surplus lasting allowance from opposite sides of a shoe, a plow spaced from said saws for loosening and guiding said lasting allowances to the cutting edges thereof, and means for imparting both horizontal and vertical movement to said plow.

12. A trimmer, comprising, in combination, a pair of cutting tools adapted respectively to trim surplus lasting allowance from opposite sides of a shoe, a plow disposed therebetween having wings insertable between the inner sole and the lasting allowance on opposite sides of the shoe, and means for imparting intermittent lifting movement to said plow, one of said wings being located under the cutting edge of each saw to protect the inner sole from the latter.

13. A trimmer, comprising, in combination, a pair of cutting tools adapted respectively to trim surplus lasting allowance from opposite sides of a shoe, a plow disposed therebetween having wings insertable between the inner sole and the lasting allowance on opposite sides of the shoe, and means for moving said plow through an approximately elliptical path.

14. A trimmer, comprising, in combination, a pair of rotary cutting discs adapted respectively to trim surplus lasting allowance from opposite sides of a shoe, a plow member located between the cutting edges of said disks and mounted for straight-line reciprocatory movement, said plow having wings provided with upwardly and rearwardly sloping guide surfaces insertable between the inner sole and lasting allowance of said shoe, and means for imparting reciprocatory movement to said plow.

15. A shank trimmer comprising in combination, a pair of cutting saws each adapted individually to saw-cut surplus lasting allowance from opposite sides of a shoe, a reciprocatory rod, means mounting said rod for straight-line reciprocatory movement, a rotatable eccentric, a crank element carried at one end by said eccentric and having its other end pivoted to said reciprocatory rod, and a plow affixed to said rod and positioned between said saws, said plow having portions insertable between the inner sole and lasting allowance of said shoe.

16. A trimmer, comprising, in combination, a pair of cutting tools adapted respectively to trim surplus lasting allowance from opposite sides of a shoe, a swingably mounted hangar, a rotatable eccentric, a pitman carried at one end by said eccentric and having its other end slidably mounted in said hanger, and a plow fixed to said pitman and positioned between said tools, said plow having portions insertable between the inner sole and lasting allowance of said shoe.

17. A trimmer, comprising, in combination, a pair of cutting tools adapted respectively to trim surplus lasting allowance from opposite sides of a shoe, guide means spaced from said tools for guiding said lasting allowance to the cutting edges thereof and means for adjusting the position of said guide means with respect to said tools to control the spacing therebetween.

18. A trimmer, comprising, in combination, a pair of cutting saws each adapted individually to saw-cut surplus lasting allowance from opposite sides of a shoe, means for adjusting said saws toward and away from each other, and a vertically adjustable interchangeable plow member disposed therebetween and spaced therefrom, said member having portions insertable under said lasting allowance, and being adapted to be replaced by similar members of varied widths.

19. A trimmer for cement-lasted shoes, comprising, in combination, a pair of rotary cutting saws adapted respectively to trim surplus lasting allowance from opposite sides of the shank of a shoe, and a reciprocating routing tool disposed between and spaced from said saws.

20. A trimmer for cement-lasted shoes comprising, a rotary saw adapted to trim excess lasting allowance from a shoe upper, an independently movable routing tool adjacent but spaced from the cutting edge of said saw to aid in presenting said lasting allowance thereto, and means for altering the respective vertical positions of said saw and routing tool.

21. A trimmer comprising a pair of spaced rotary cutting tools having their cutting edges spaced apart a distance equivalent to that desired between the trimmed edges of the lasting allowance at the shank of a shoe upper, a driven spindle carrying each of said tools, at least one of said tools having means for adjustment in the direction of its spindle axis, said adjusting means comprising a bushing with said spindle rotatably mounted therein, means preventing relative axial movement between said bushing and spindle, a fixed journal bearing supporting said bushing, and means for sliding said bushing axially with respect to said journal bearing.

WILLIAM CARPENTER CARD, Jr.